(12) United States Patent
Pinals et al.

(10) Patent No.: US 10,212,424 B2
(45) Date of Patent: Feb. 19, 2019

(54) MAXIMUM ENTROPY QUANTIZATION OF LINK STATE

(71) Applicant: Tufts University, Medford, MA (US)

(72) Inventors: Lisa Pinals, Somerville, MA (US); Mai Vu, Belmont, MA (US)

(73) Assignee: Tufts University, Medford, MA (US)

( * ) Notice: Subject to any disclaimer, the term of this patent is extended or adjusted under 35 U.S.C. 154(b) by 103 days.

(21) Appl. No.: 15/185,147

(22) Filed: Jun. 17, 2016

(65) Prior Publication Data

US 2017/0366809 A1    Dec. 21, 2017

(51) Int. Cl.
*H04N 11/02* (2006.01)
*H04N 19/126* (2014.01)
*H04N 19/13* (2014.01)

(52) U.S. Cl.
CPC ........... *H04N 19/126* (2014.11); *H04N 19/13* (2014.11)

(58) Field of Classification Search
CPC .................................................. H04N 19/126
USPC ....................................... 375/240.01–240.29
See application file for complete search history.

(56) References Cited

U.S. PATENT DOCUMENTS

| | | | | |
|---|---|---|---|---|
| 6,990,246 B1 * | 1/2006 | Ferguson | ............. | H04N 19/172 |
| | | | | 375/E7.037 |
| 9,774,381 B2 * | 9/2017 | Kim | ......................... | H04B 7/15 |
| 9,867,205 B2 * | 1/2018 | Hui | ..................... | H04W 72/085 |
| 2009/0207937 A1 * | 8/2009 | Yang | ..................... | H04L 1/0014 |
| | | | | 375/296 |
| 2010/0074194 A1 * | 3/2010 | Liu | ........................ | H04L 45/124 |
| | | | | 370/329 |
| 2010/0172249 A1 * | 7/2010 | Liu | ........................ | H04L 45/124 |
| | | | | 370/252 |
| 2011/0044169 A1 * | 2/2011 | Liu | ........................ | H04L 45/026 |
| | | | | 370/235 |
| 2011/0230224 A1 * | 9/2011 | Larsson | .............. | H04W 72/082 |
| | | | | 455/513 |

(Continued)

OTHER PUBLICATIONS

Bi, et al., "A Cross Layer Broadcast Protocol for Multihop Emergency Message Dissemination in Inter-Vehicle Communication," in IEEE Int'l Conf. on Comm. (2010).

(Continued)

*Primary Examiner* — Leron Beck
(74) *Attorney, Agent, or Firm* — Occhiuti & Rohlicek LLP (57) ABSTRACT

An approach to communication of a quantized value includes communicating one or more parameters characterizing a distribution of the values, and then repeatedly quantizing values according to the distribution and communicating the transmitted values. In some examples, the quantizing of the values is according to a maximum-entropy codebook determined from the distribution (or from the parameters characterizing the distribution). In one application, a network communication method communicates link state values among nodes of the network using this approach to communication of quantized values. For example, link state information is distributed among nodes of the network by distributing parameters characterizing distributions of the link state values for particular links, and quantizing the link state values according to codebooks determined from the parameters. In some examples, the parameters characterizing the distributions are distributed less frequently than the quantized values.

13 Claims, 2 Drawing Sheets

(56) References Cited

U.S. PATENT DOCUMENTS

2012/0300654 A1* 11/2012 Gan ................. H04B 7/155
370/252

OTHER PUBLICATIONS

Cover, et al., "Capacity Theorems for the Relay Channel," IEEE Trans. on Info. Theory, 25:572-584 (1979).
Dressler, et al., "Inter-vehicle Communication: Quo Vadis," IEEE Comm. Mag., 52(6):170-177 (2014).
Haija, et al., "Outage Analysis for Coherent Decode-Forward Relaying over Rayleigh Fading Channels," IEEE Trans. Comm., 63(4):1162-1177 (2015).
Lloyd, S., "Least Squares Quantization in PCM," IEEE Trans. on Info. Theory, 28(2):129-137 (1982).
Love, et al., "An Overview of Limited Feedback in Wireless Communication Systems," IEEE J. on Selected Areas in Comm., 26:1341-1365 (2008).
Makhoul, et al., "Vector Quantization in Speech Coding. Proc. of the IEEE," 73(11):1551-1588 (1985).
Max, J., "Quantizing for Minimum Distortion," IRE Trans. on Info. Theory, 6(1):7-12 (1960).
Pinals, et al., "Link State Based Decode-Forward Schemes for Two-Way Relaying," In IEEE Globecom Workshop Wi5G (2014).
Shannon, C., "Coding Theorems for a Discrete Source with a Fidelity Criterion," Int'l Conv. Record, Institute of Radio Engineers, 7 (1959).

* cited by examiner

MAXIMUM ENTROPY QUANTIZATION OF LINK STATE

FEDERAL SPONSORSHIP

This invention was made with government support under N00014-14-1-0645 awarded by the Office of Naval Research. The government has certain rights in the invention.

PRIOR DISCLOSURES BY INVENTOR

L. Pinals and M. Vu, "Maximum entropy quantization for link-state adaptation in two-way relaying," *Military Communications Conference, MILCOM 2015-2015 IEEE*, Tampa, Fla., October 2015, pp. 1691-1696. (hereinafter [Pinals2015]).

L. Pinals, A. A. Al Haija and M. Vu, "Link Regime and Power Savings of Decode-Forward Relaying in Fading Channels," in *IEEE Transactions on Communications*, vol. 64, no. 3, pp. 931-946, March 2016. (hereinafter [Pinals2016a])

L. Pinals and M. Vu, "Link-State Optimized Decode-Forward Transmission for Two-Way Relaying," in *IEEE Transactions on Communications*, vol. 64, no. 5, pp. 1844-1860, May 2016. (hereinafter [Pinals2016b])

These publications are incorporated herein by reference.

BACKGROUND

This invention relates to entropy-based quantization, including maximum-entropy quantization, and more particularly to use of such quantization to communicate link state in a communication network, and yet more particularly to communication of link state for the purpose of relay-based communication in the network.

In a wireless mobile network, relaying is a viable technique for maintaining high performance communication among different parties. As an example, in a heterogeneous network two users may communicate via an intermediate node rather than or in addition to communicating directly to improve transmission rate and coverage. In an ad hoc setting, relaying can be applied among all users [Dressler et al., 2014]. A third user can act as a relay for two active users, such as in emergency message dissemination [Bi et al., 2010]. Relaying can also be applied in other scenarios such as infrastructure-aided, cellular, and vehicular networks. By employing two-way relaying, both the rate and reliability can be increased [Haija and Vu, 2015] [Pinals and Vu, 2014].

One approach to relaying uses a decode-and-forward (DF) strategy. With DF, the effects of the noise are removed completely at the relay by decoding the message before re-encoding it to transmit to the destination [Cover and El Gamal, 1979]. The composite DF transmission technique (e.g., as developed in [Pinals and Vu, 2014]) combines two transmission techniques such that the resulting scheme can be tailored to the link state of the system in order to achieve the best rate using minimum relay transmit power.

The state of a link in a radio network may be affected by Rayleigh fading. Given that links between users fade randomly, the transmission scheme preferably is adapted to the link state in order to obtain the best rate performance. To employ the composite relaying scheme in fading, the link states are distributed among the nodes, and by necessity must be quantized for transmission. Conventional quantization approaches, which have been a well studied topic in data compression [Max, 1960], [Lloyd, 1982] and have been applied in communication, may be applied to the communication of link state via codebook design for limited feedback [Love et al., 2008]. Conventionally, scalar quantizers are designed to be optimal in the sense that they minimize the expected distortion, such as the Lloyd-Max algorithm [Max, 1960] [Lloyd, 1982].

REFERENCES

[Bi et al., 2010] Bi, Y., Cai, L., Shen, X., and Zhao, H. (2010). A Cross Layer Broadcast Protocol for Multihop Emergency Message Dissemination in Inter-Vehicle Communication. In *IEEE Intl Conf. on Comm.*

[Cover and El Gamal, 1979] Cover, T. M. and El Gamal, A. (1979). Capacity Theorems for the Relay Channel. *IEEE Trans. on Info. Theory*, 25:572-584.

[Dressler et al., 2014] Dressler, R, Hartenstein, H., Altintas, O., and Tonguz, O. (2014). Inter-vehicle Communication: Quo Vadis. *IEEE Comm. Mag*, 52(6):170-177.

[Haija and Vu, 2015] Haija, A. and Vu, M. (2015). Outage Analysis for Coherent Decode-Forward Relaying over Rayleigh Fading Channels. *IEEE Trans. Comm.*, 63 (4): 1162-1177.

[Lloyd, 1982] Lloyd, S. (1982). Least Squares Quantization in PCM. *IEEE Trans. on Info. Theory*, 28(2):129-137.

[Love et al., 2008] Love, D., Heath, R., Lau, V., Gesbert, D., Rao, B., and Andrews, M. (2008). An Overview of Limited Feedback in Wireless Communication Systems. *IEEE J. on Selected Areas in Comm.*, 26:1341-1365.

[Makhoul et al., 1985] Makhoul, J., Roucos, S., and Gish, H. (1985). Vector Quantization in Speech Coding. *Proc. of the IEEE*, 73(11):1551-1588.

[Max, 1960] Max, J. (1960). Quantizing for Minimum Distortion. *IRE Trans. on Info. Theory*, 6(1):7-12.

[Pinals and Vu, 2014] Pinals, L. and Vu, M. (2014). Link State Based Decode-Forward Schemes for Two-Way Relaying. In *IEEE Globecom Workshop Wi5G*.

[Shannon, 1959] Shannon, C. (1959). Coding Theorems for a Discrete Source with a Fidelity Criterion. *Intl Conv. Record, Institute of Radio Engineers*, 7.

SUMMARY

In one aspect, in general, an approach to communication of a quantized value includes communicating one or more parameters characterizing a distribution of the values, and then repeatedly quantizing values according to the distribution and communicating the quantized values. An estimate of the original value may be reconstructed from a quantized value, for example, according to the one or more parameters characterizing the distribution (e.g., as an conditional expected value). In some examples, the quantizing of the values is according to a maximum-entropy codebook determined from the distribution (or from the parameters characterizing the distribution).

In another aspect, in general, a network communication method communicates link state values among nodes of the network using the above-identified approach to communication of quantized values. For example, link state information is distributed among nodes of the network by distributing parameters characterizing distributions of the link state values for particular links, and quantizing the link state values according to codebooks determined from the parameters. In some examples, the parameters characterizing the distributions are distributed less frequently than the quantized values.

In the context of network communication with distribution of link state information, for example, using a decode-and-forward relaying approach, an advantage of using a technique outlined above is reduced network capacity for exchanging link state information for a given level of performance, or improved network performance (e.g., throughput) given a fixed capacity used for exchange of link state information.

In some examples, a quantizer is designed to maximize the entropy of the codebook to ensure that the frequency each quantized value is expected to be used is substantially equal. For a fixed set and large number of quantized values, a codebook which maximizes the entropy also minimizes the expected distortion [Shannon, 1959] [Makhoul et al., 1985]. However, if only a small number of bits are used in quantizing data, then the two design criterion result in different quantizers. Even though the quantizer of link state information may not be optimal from a distortion point of view, it nevertheless provides an unexpected improved performance of an overall link state adaptation communication approach as compared to a minimum distortion quantizer using the same number of bits.

DETAILED DESCRIPTION

1 Entropy-Maximizing Quantization

Before discussion of application to link-state adaptation in a communication network, approaches to quantizer design are described in this section.

In one embodiment of maximum entropy (ME) quantization, the approach seeks to maximize the entropy of the output quantization indices as opposed to the more traditional approach of minimizing distortion (e.g., mean squared error between a quantized value associated with a quantization index and the unquantized value). This ME quantization technique can be applied in a wide array of settings in which the distribution of the data is known or can be estimated. The ME quantizer described below is based on a known distribution (i.e., a parametric or non-parametric Probability Density Function, PDF) of the data. In many examples, the ME quantizer can be quickly adapted to a changing PDF model (e.g., to changing parameters of a parametric family of PDF, or to a different distribution entirely) without requiring iterations to find the partition of the domain of values and corresponding quantized values.

We first describe the general ME quantization method and then apply this method to quantize the squared magnitude of a variable from a Rayleigh distribution, which can be used to parameterize the PDF of a link state for a fading radio channel. In such an application, information about the channel magnitude can be fed back to the transmitter to achieve higher data rates. Therefore, we describe the ME quantization algorithm in terms of a wireless communication problem but we emphasize that this method has wide application in other disciplines.

Suppose scalar data x with a known distribution function is to be quantized using b bits resulting in $n=2^b$ quantization indices. The $(2^b-1)$ partition values (i.e., boundaries between parts of the range of the data) are determined by the quantile function, $Q(p)$ for this known distribution, $f_X(x)$, where p is varied in integer multiples of $(\frac{1}{2}^b)$, from $p=(\frac{1}{2}^b)$ to $p=(1-\frac{1}{2}^b)$.

The partition is determined by the quantile function, otherwise known as the inverse Cumulative Distribution Function (CDF), and by design, each quantized value is equiprobable. Hence the quantizer output entropy is maximized. The quantized value is a function of the data in the corresponding partition. For example, it could be the conditional expected value given a particular quantization index q:

$$\hat{x}_q = \mathbb{E}[x \mid \text{index } q] = 2^b \int_{Q\left(\frac{q-1}{2^b}\right)}^{Q\left(\frac{q}{2^b}\right)} x f_X(x) dx. \quad (1)$$

This quantization method is simple to implement and in general outperforms uniform quantization in the link-state example because it takes the specific distribution of the link into account. Note that if the quantile function is not available, the partition and quantized values can be determined numerically from the PDF.

As an example, which is relevant to the Rayleigh fading link state situation, consider an exponential PDF $$f_X(x; \lambda) = \lambda \exp(-\lambda x) \text{ (for } x \geq 0) \quad (2)$$

which has a CDF $$F_X(x; \lambda) = \int_0^x f_X(\tilde{x}) d\tilde{x} = 1 - \exp(-\lambda x) \text{ (for } x \geq 0) \quad (3)$$

and a quantile function (i.e., inverse of the CDF)

$$Q_X(p; \lambda) = -\frac{\ln(1-p)}{\lambda} \text{ (for } 0 \leq p < 1) \quad (4)$$

Therefore, the $q^{th}$ boundary for a b bit quantizer for such a distribution is $$Q_X(q/2^b; \lambda) = -\frac{\ln(1-q/2^b)}{\lambda} \text{ (for } 1 \leq q \leq 2^b - 1) \quad (5)$$

and the $q^{th}$ quantized value, $\tilde{x}_q$, can be selected as the conditional expected value of x given that it is in the qth partition:

$$\hat{x}_q = 2^b \int_{Q\left(\frac{q-1}{2^b}, \lambda\right)}^{Q\left(\frac{q}{2^b}, \lambda\right)} \lambda x \exp(-\lambda x) dx \quad (6)$$

$$= -\frac{2^b(\lambda x + 1)\exp(-\lambda x)}{\lambda} \Big|_{Q\left(\frac{q-1}{2^b}; \lambda\right)}^{Q\left(\frac{q}{2^b}; \lambda\right)} \quad (7)$$

$$= \left(\frac{1}{\lambda}\right)(1 + (2^b - q)\ln(1 - q/2^b) - (2^b + 1 - q)\ln(1 - (q-1)/2^b)) \quad (8)$$

Therefore, a receiver who has been informed of the parameter λ characterizing the distribution $f_X(x; \lambda)$, upon receiving q (a b-bit value), can reconstruct the quantized value $\hat{x}_q$ according to equation 8. Note that in this case of an exponential distribution, the set of quantized values are linearly scaled by $1/\lambda$.

For reference, for b=3 and λ=1, the boundaries and quantized values are as follows:

| index | boundary value | quantized value |
|---|---|---|
| q = 1 | | 0.065 |
| | 0.134 | |
| q = 2 | | 0.209 |
| | 0.288 | |
| q = 3 | | 0.376 |
| | 0.470 | |
| q = 4 | | 0.577 |
| | 0.693 | |
| q = 5 | | 0.830 |
| | 0.981 | |
| q = 6 | | 1.170 |
| | 1.386 | |
| q = 7 | | 1.693 |
| | 2.079 | |
| q = 8 | | 3.079 |

It should be understood that a wide variety of parametric forms of distributions (i.e., other than exponential) can be addressed in this same manner. For instance, a Rayleigh distribution of the form $f_X(x)=(x/\sigma^2)\exp(-x/2\sigma^2)$ can addressed in a like manner. Furthermore, although one-parameter distributions are described above, a like approach may be applied to PDFs with multiple parameters by identifying multidimensional regions with equal probability mass in each region.

2 Link-State Based Transmission

As introduced above, one approach to communication over a wireless channel is for a first node in the network, when transmitting data to a second node to allocate transmission power between a direct path to the second node, and via a relay node that forwards the data to the second node.

Generally, relaying is a technique that is used to improve wireless (e.g., radio frequency, optical, ultrasound) communication. To achieve high efficiency in a relaying system, when a source node that is able to communicate with a destination node both directly as well as indirectly via a relay node, the source node makes a decision regarding the manner of encoding the data being transmitted and/or allocates power to a direct transmission as well as to an indirect transmission based on characteristics of the links involved in the direct as well as the indirect paths from the source node to the destination node. One important characterization of the link is the effective noise of the link under a channel model (in a scalar, complex-valued case)

$$Y = hX + Z \text{ where } Z \sim CN(0,I) \quad (9)$$

where X is transmitted, Y is received, and Z is independent complex Gaussian noise with zero mean and unit variance. As an example, consider Rayleigh fading channels. As such, h are complex link gain coefficients that follow a Rayleigh distribution. The amplitude of each link gain coefficient g, where g=|h| therefore follows an exponential distribution: $g^2 \sim \exp(\lambda)$, is an exponential random variable with parameter $\lambda$.

2.1 Basic Relay Channel

Figure 1:
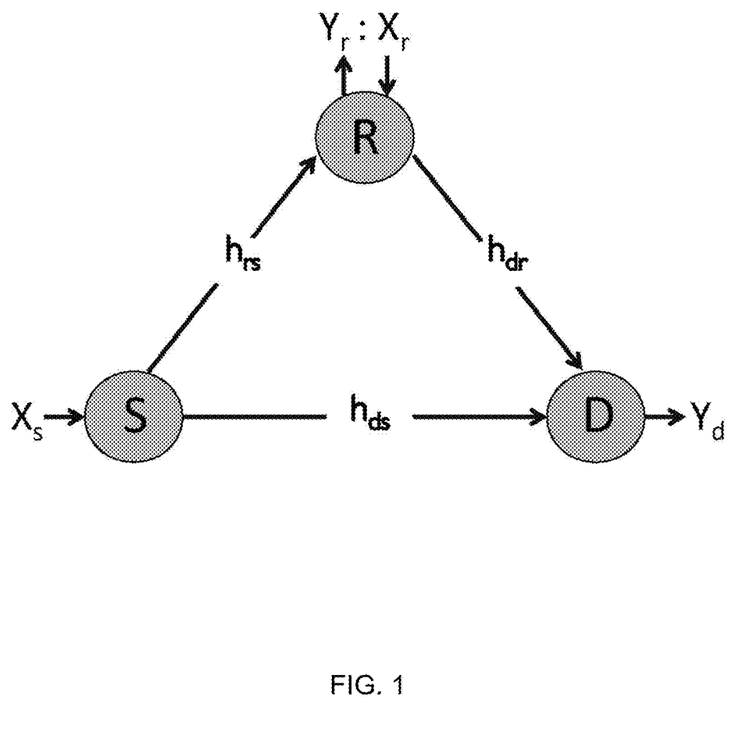
FIG. 1 is a diagram showing three nodes: a source node (S), a destination node (D), and a relay node (R)

Referring to FIG. 1 in the present relay model, it is assumed an origin node (S) and a relay node (R) are able to make coherent transmissions of signals $X_s$ and $X_r$, respectively. such that the destination node (D) receives $$Y_d = h_{ds}X_s + h_{dr}X_r + Z_d \text{ where } Z_d \sim CN(0,I) \quad (10)$$

Assuming a "one-way" protocol in which the destination does not transmit at the same time or frequency as the source node transmits $X_s$, the relay node receives $$Y_r = h_{rs}X_s + Z_r \text{ where } Z_r \sim CN(0,I) \quad (11)$$

We assume coherent transmission in which the source has phase transmit channel state information (CSIT) for the source-to-relay and direct links ($h_{rs}$ and $h_{ds}$ respectively). The relay has phase CSIT for the relay-to-destination link, $h_{dr}$. Neither the source nor the relay have amplitude CSIT for any links. This information is fed back using ME quantization as described in Section 1. We assume receiver channel state information (CSI) in which a node receiving a message on a link knows the channel amplitude of that link. Receiver CSI is a standard assumption and can be obtained directly by adapting estimation algorithms, such as those described in T. Cui, R Gao, and A. Nallanathan, "Optimal Training Design for Channel Estimation in Amplify and Forward Relay Networks," in *Global Telecomm Conf.*, November 2007, pp. 4015-4019.

Further, we assume that the source continuously sends information in the form of bits, or a message, to the destination utilizing the relay. Time is broken up into blocks and in each time block, the source sends a new message. We assume synchronization among the nodes such that nodes are simultaneously operating in the same time block.

Figure 2:
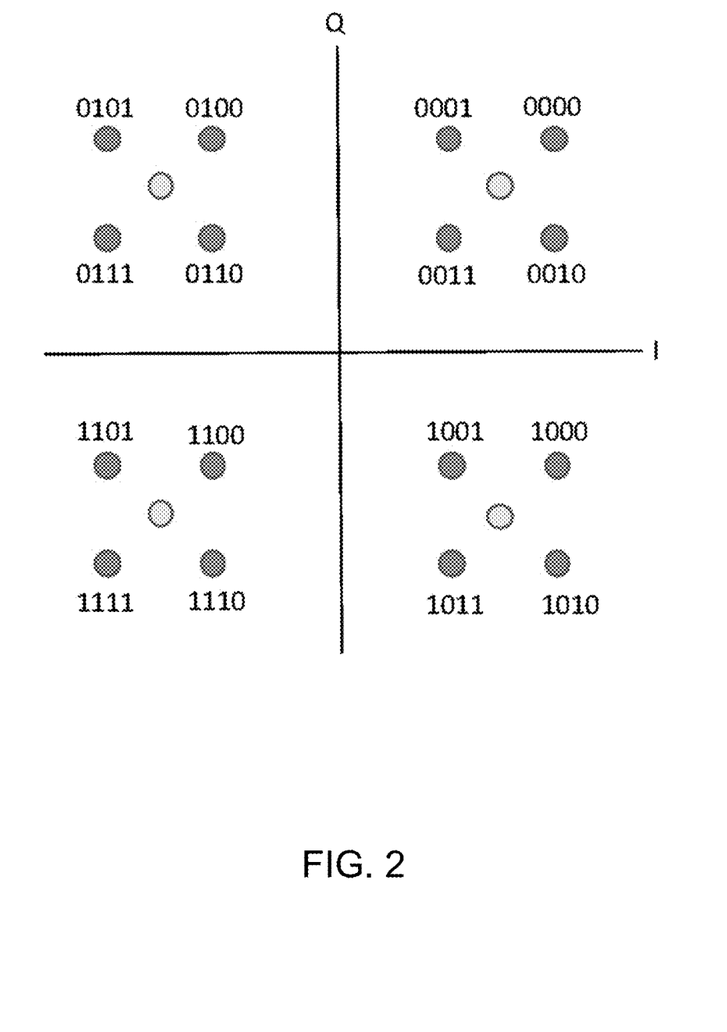
FIG. 2 is a diagram of a signal constellation.

A variety of different modulation schemes can be used with this composite relay channel transmission. As an example, assume quadrature phase shift keying (QPSK). The superposition of one QPSK signal on another QPSK signal is shown in FIG. 2 as a constellation diagram with in-phase (I) and quadrature (Q) axes. The light circles are the QPSK constellation while the dark circles are the superposition of one QPSK signal on another QPSK signal. The scheme described in this section is based on that described in [Pinals2016a]. In order to derive theoretical results in those references, Gaussian signals are assumed which applies to a very large constellation size. Any constellation can be used with this scheme though and here we use QPSK as an example.

In each transmission block i, the source (S) encodes new information (or message $m_i$) by superposing it onto the old information ($m_{i-1}$). The superposition of the current message onto the message of the previous block is known as block Markov coding. The relay (R) utilizes both block Markov coding and independent coding. It first performs independent coding by computing a function of the decoded message $m_i$, resulting in codeword $l_i$. Then the relay superposes this codeword for $l_i$ onto the codeword for $m_i$ and transmits the signal of this superposed codeword in block i+1.

The source and relay construct their respective transmit signals in block i as follows:

$$X_{s,i} = \sqrt{\alpha_s}W_s(m_{i-1}) + \sqrt{\beta_s}U_s(m_i),$$

$$X_{r,i} = \sqrt{k_s\alpha_s}W_s(m_{i-1}) + \sqrt{\beta_r}U_r(l_{i-1}), \quad (12)$$

where $W_s$, $U_s$, $U_r$ are signals from a particular modulation scheme (such as QPSK) that encode the respective messages. Power allocation factors $\alpha_s$, $\beta_s$, $\beta_r$ and scaling factor $k_s$ are determined by the link amplitudes and dictate the power allocated to each signal. These power allocation factors are non-negative and satisfy a power constraint at each node:

$$\alpha_s + \beta_s \leq P_s, k_s\alpha_s + \beta_r \leq P_r. \quad (13)$$

where $P_s$ and $P_r$ are the maximum transmit powers of the source and relay respectively.

Here $\alpha_s$ represents the power allocated to the traditional block Markov component. If $\alpha_s > 0$ then block Markov coding is utilized. Conversely, if $\alpha_s = 0$ then block Markov coding is not utilized. Block Markov coding creates a coherency between the signal transmitted from the source and relay that ultimately results in a beamforming gain but requires power splitting between old and new messages at the source.

In addition, if $\beta_r > 0$, the relay also employs independent coding. With independent coding, the relay creates a new signal $U_r$ with power $\beta_r$ that independently encodes the message. Independent coding allows the source the option to devote full power to the new message of that block. Thus the two techniques (block Markov and independent coding) have different implications on the source's power allocation which ultimately affects the achievable rate depending on the link state.

The destination employs backward decoding (e.g., as described in R. El Gamal and Y.-H. Kim, *Network Information Theory*, 1st ed., Cambridge University Press, 2011. pp. 391-393) or forward sliding window decoding over two consecutive blocks (e.g., as described in Gamal and Kim at pp. 462-464). Both decoding techniques achieve the same rate for this channel. At the relay, decoding is similar to the single user case.

In each block, the source and relay node make a decision regarding the transmit power allocated to the block Markov component and independent coding component of the transmit signal based on the channel gains in that particular transmission block, $g_{ds}$, $g_{rs}$, and $g_{dr}$. In particular, a transmission scheme and associated power allocation ($\alpha_s$, $\beta_s$, $k_s$, $\beta_r$) is determined by the relationships among the channel gains as described next.

A set of link-state regimes is defined according to the relationship among channel amplitudes. Specifically, depending on the relative strength of the source-to-relay channel $g_{rs}$ compared to the other link gains, it follows which transmission scheme to employ:

$$\mathcal{R}0: g_{rs}^2 \in [0, g_{ds}^2], \text{ Direct Transmission} \tag{14}$$

$$\mathcal{R}1: g_{rs}^2 \in \left(g_{ds}^2, g_{ds}^2 + \frac{P_r}{P_s}g_{dr}^2\right] \text{ Independent Coding,}$$

$$\mathcal{R}2: g_{rs}^2 \in \left(g_{ds}^2 + \frac{P_r}{P_s}g_{dr}^2, \infty\right), \text{ Block Markov Coding}$$

Simply based on the relative link amplitude values, the rate-optimal transmission strategy is immediately determined based on the regimes shown in (14). If the source-to-relay link is weaker than the direct link, $\mathcal{R}0$ is the appropriate link-state regime and direct transmission should be employed; in this case the relay does not decode or forward the source's message. Independent coding is optimal when the source-to-relay link amplitude is classified in $\mathcal{R}1$. Block Markov coding is optimal when the source-to-relay link is very strong in link regime $\mathcal{R}2$.

For the basic relay channel, the optimal power allocation can be expressed in closed form in each link regime of (14). The rate-optimal power allocation within each link-state regime is as follows.

$$\mathcal{R}0: \alpha_s = k_s = \beta_r = 0 \tag{15a}$$

$$\mathcal{R}1: \alpha_s = k_s = 0, \beta_r = \frac{g_{rs}^2 - g_{ds}^2}{g_{dr}^2}P_s \tag{15b}$$

$$\mathcal{R}2: \beta_r = 0, \alpha_s = \xi, k_s = \frac{P_r}{\alpha_s}, \text{ where} \tag{15c}$$

$$\xi = \left[\frac{-g_{ds}g_{dr}\sqrt{P_r} + \sqrt{g_{ds}^2 g_{dr}^2 P_r - g_{rs}^2(g_{dr}^2 P_r + g_{ds}^2 P_s - g_{rs}^2 P_s)}}{g_{rs}^2}\right]^2$$

Note that in all regimes, $\beta_s = P_s - \alpha_s$ since the source uses full power. The relay, however, can save power in link regime $\mathcal{R}1$. In $\mathcal{R}1$, the relay power is equivalent to $\beta_r$ which is less than $P_r$. In this link regime, the relay transmits using only partial power but still achieves the maximum rate.

The choice to employ block Markov coding, independent coding or direct transmission, as well as power allocation in each of these cases, depend upon the channel amplitudes. Therefore this information must be fed back to the transmitting nodes (i.e. the source and relay) in order to adapt to the changing link amplitudes in fading.

As a representative case, the source has no CSI for the link between the destination and the relay. However, the destination does have CSI for this relay-to-destination link via receive CSI. This link information is quantized and fed back to accurately implement the composite DF scheme. Link adaptation using ME quantization is further discussed in Section 3.

2.2 Two-Way Relay Channel

Next we describe the link-state based decode-and-forward scheme that combines block Markov coding with independent coding for the two-way relay channel (TWRC). In this case both sources (S1,S2) communicate bidirectionally with the help of the relay node (R).

The scheme described here is an extension of the basic relay channel composite scheme described in Section 2.1. Here both sources have new messages to send in each transmission block. Depending on the relative link amplitudes, this scheme describes which users utilize the relay and which transmission strategy (block Markov coding, independent coding, a combination of both) is optimal. If a user utilizes the relay, the relay decodes the signal of that user and forwards that user's information. If a user does not utilize the relay, it communicates with the other source using the direct link only. Note that in this case, the direct transmission will result in interference at the relay as the relay does not decode the signal of this user.

The full duplex TWRC can be modeled as $$Y_1 = h_{12}X_2 + h_{1r}X_r + Z_1,$$

$$Y_2 = h_{21}X_1 + h_{2r}X_r + Z_2,$$

$$Y_r = h_{r1}X_1 + h_{r2}X_2 + Z_r, \tag{16}$$

where the link gain coefficients are assumed to be complex value Rayleigh fading (and link amplitudes are exponentially distributed) as in the previous section. We again assume synchronization, receive CSI, and known phase CSIT but no amplitude CSIT as in the previous section. The composite DF transmission scheme for the TWRC is an extension of the basic relay channel composite DF scheme presented in the previous section. We refer the reader to [Pinals2016b] for the full details.

In the proposed schemes, the relay can perform independent coding, block Markov coding, or a combination of the two. Sources can transmit with or without block Markov coding. We next present the rate-optimal transmission strategy depending on the relation among link gain amplitudes. Further, we present the link conditions under which it is optimal for both users to utilize the relay, for only one user to utilize the relay, or for neither user to utilize the relay. Similar to the link-state regimes in Section 2.1, the channel configuration can be classified in a certain link-state regime, which defines a relative range among all link gain coefficients. The specific link-state regime reveals which users should utilize the relay and which relaying technique, or combination, is optimal.

In the case of the TWRC, the link-state regimes depend upon the classification of both source-to-relay links. Depending on the other link amplitudes of the TWRC channel model, there will be a link regime for both the source 1-to-relay link and source 2-to-relay link as described next.

For the link gain from user 1 to the relay, $g_{r1}$, we define the following regimes:

$$\mathcal{I}1_a: g_{r1}^2 \in [0, g_{21}^2], \quad (17)$$

$$\mathcal{I}1_b: g_{r1}^2 \in \left(g_{21}^2, g_{21}^2 + \frac{P_R}{P_1}g_{2r}^2\right]$$

$$\mathcal{I}2: g_{r1}^2 \in \left(g_{21}^2 + \frac{P_R}{P_1}g_{2r}^2, \infty\right)$$

For the link gain from user 2 to the relay, $g_{r2}$, we define link-state regimes as follows:

$$\mathcal{Q}1_a: 0 \le g_{r2}^2 \le g_{12}^2(1 + g_{r1}^2 P_1) \quad (18)$$

$$\mathcal{Q}1_b: g_{12}^2(1 + g_{r1}^2 P_1) < g_{r2}^2 \le (g_{21}^2 P_1 + g_{2r}^2 P_R + 1)\left(g_{12}^2 + \frac{P_R}{P_2}g_{1r}^2\right)$$

$$\mathcal{Q}2: g_{r2}^2 > (g_{21}^2 P_1 + g_{2r}^2 P_R + 1)\left(g_{12}^2 + \frac{P_R}{P_2}g_{1r}^2\right)$$

$$g_{r2}^2 \le (g_{r1}^2 P_1 + 1)\left(g_{12}^2 + \frac{P_R}{P_2}g_{1r}^2\right)$$

$$\mathcal{Q}3: (g_{r1}^2 P_1 + 1)\left(g_{12}^2 + \frac{P_R}{P_2}g_{1r}^2\right) < g_{r2}^2 < \infty$$

For a given set of link amplitudes ($g_{r1}$, $g_{2r}$, $g_{2r}$, $g_{r2}$, $g_{12}$, $g_{1r}$) a link regime for both source to relay links are computed according to (17) and (18). Then, using these link regimes, the corresponding transmission technique is read off of the following table of optimal technique by link regime:

|  | $g_{r2}^2$ | | | |
|---|---|---|---|---|
| $g_{r1}^2$ | $\mathcal{Q}1_a$ | $\mathcal{Q}1_b$ | $\mathcal{Q}2$ | $\mathcal{Q}3$ |
| $\mathcal{I}1_a$ | U1: DT | U1: DT | | U1: DT |
|  | U2: DT | U2: Ind | | U2: BM |
| $\mathcal{I}1_b$ | U1: Ind | U1: Ind | | U1: Ind |
|  | U2: DT | U2: Ind | | U2: BM |
| $\mathcal{I}2$ | U1: BM | U1: BM | U1: Both | |
|  | U2: DT | U2: Ind | U2: Both | | where U1 is user 1, U2: user 2, 'DT': direct transmission, 'Ind': independent coding only, 'BM': block Markov coding only, 'Both': BM and Ind.

For example, assume $g_{r1}$ is classified in link regime $\mathcal{I}1_b$ and $g_{r2}$ is classified in link regime $\mathcal{Q}2$, then reading off of Table 1, the optimal transmission technique is for both users to perform independent coding; this implies that both users utilize the relay.

Using this link-state based transmission scheme, in some link conditions, the achievable rate is higher than that of block Markov coding or independent coding alone. Further, in link regimes where the relay only performs independent coding, the relay conserves power while still achieving the maximum rate. Note that this is a slightly simplified version of the results presented in [Pinals2016b].

The choice of which users utilize the relay as well as the choice to employ block Markov coding, independent coding or a combination of both depends upon the channel amplitudes. Therefore this information must be fed back to the transmitting nodes (i.e. both sources and relay in this case of the TWRC) in order to adapt to the changing link amplitudes in fading. Link adaptation using ME quantization is further discussed in Section 3.

2.3 Other Network Problems that Benefit from Link-State Information

Sections 2.1 and 2.2 describe two very specific wireless communications examples in which channel state information must be fed back to transmitting nodes in order to increase performance. In both of these cases, the amplitude of forward links is not known at the transmitters. Due to receive CSI, this information is known at the receivers and fed back to the transmitters. This link-state feedback allows transmitters to adapt to the changing link states.

The basic relay channel and two-way relay channel examples in Sections 2.1 and 2.2 are for three nodes. When looking at a broader network with many more nodes, either scheme could be applied to a subset of three nodes in a larger network.

Beyond the relay channel examples, link adaptation using feedback and maximum entropy quantization can be utilized in any application in which transmitting nodes require channel state information. Further, this fed back CSI is not limited to channel amplitudes.

For example, consider the pre-maximal-ratio-combining transmit beamforming technique in which the transmitter has multiple antennas. The transmitter allocates power to these transmit antennas based on the instantaneous channel gains. Further, the channel phase shifts are compensated for at each transmit antenna such that the transmitted signals are coherently combined at the receiver. For this to work successfully, the receiver needs to feed back the instantaneous channel gains to the transmitter. One method for feeding back this information is using maximum entropy quantization.

Next consider waterfilling over either time or frequency in which the transmit power or data rate is increased when channel conditions are favorable and decreased when channel conditions are not favorable. Waterfilling in time implies that the transmitter waits until the channel conditions are favorable to transmit. For a frequency subdivided channel with many subcarriers (such as an OFDM system), the transmitter chooses to allocate power to the best subcarriers; this is waterfilling in frequency. In order for the transmitter to appropriately allocate power depending on the channel conditions, the receiver must feed back channel state information to the receiver. Maximum entropy quantization is one method to feed back this information.

Another application of maximum entropy quantization is in computing the channel quality indicator (CQI) used in current LTE cellular standards. As its name implies, the CQI indicates the quality of the channel as reported by the user equipment (UE) to the evolved NodeB (eNB). A higher CQI value (from 0 to 15) indicates that a higher modulation scheme can be successfully employed. Therefore if the channel conditions are favorable as reported with the CQI feedback, a higher coding rate can be supported to achieve higher efficiency. The method for computing the CQI is currently not specified in cellular standards and is up to the chipmakers. Maximum entropy quantization with 4 bits could be utilized for computing the CQI.

3 Link-State Adaptation with ME Quantization

Note that the source node can receive information about $g_{ds}^2$ in a message from the destination node, and information about $g_{dr}^2$ must also be communicated directly, or indirectly via the relay node R, to the source node. One way of passing this information is to, on each transmission from a node A to a node B to include $g_{AB}^2$ as well as $g_{AC}^2$ for nodes C that might act as relays between A and B. However, such ongoing transmission can consume significant communication resources (e.g., power). Alternatively, an average gain, for example, $\bar{g}_{AB}^2$, is transmitted from time to time. However, between transmission of the average gain, decisions made by the nodes may not be optimal because the actual gains deviate from the average.

An alternative is to transmit the averages $\bar{g}_{AB}^2$ from time to time, and more frequently transmit information relative to that mean. An average $\bar{g}_{AB}^2$ characterizes a distribution of $g_{AB}^2$ because if $\bar{g}_{AB}^2 \sim \exp(\lambda_{AB})$ then $\bar{g}_{AB}^2 = 1/\lambda_{AB}$. One way of transmitting the information relative to the mean is to quantized the measured $g_{AB}$ at node A as an index $q_{AB}$ using an entropy-based codebook (e.g., a b=3 bit codebook) designed using the quantizer design procedure described above. For example, if a node A is to send quantized information about the B-to-A link and k C-to-A links, then b(k+1) are used.

In some embodiments, node B reconstructs the gains as described above (see Equation 1, above), for example, as the conditional expected value $$\hat{g}_{AB}^2 = \mathbb{E}[g_{AB}^2 | q_{AB}; \lambda_{AB}] \tag{19}$$

and then determines the regime according to which it encodes its data according to the reconstructed gains. In other embodiments, node B determines which regime it is in based on the conditional distributions of the gains given the quantized values q.

The approach to link-state adaptation using Maximum-Entropy quantization can be summarized as follows from the point of view of a node (A). The node collects link state values ($g_{AX}^2$) from received transmissions from other nodes (X). From time to time (i.e., repeatedly, for example, according to a timer, a number of received transmissions, or other criterion), the node determines values of one or more parameters characterizing a distribution of the collected link state values from each of those nodes. As described above, in a one-parameter example, the node determines $\bar{g}_{AX}^2$ for each of the node (X) from which it has received transmissions. Having determined these distribution parameters, it transmits them to the other nodes. The other nodes are following a similar procedure, so repeatedly the node receives the parameters of the link-state distributions for links to those other nodes (i.e., for transmission received at those nodes from node A as well as from other nodes).

The node determines a partition of the domain of possible link state values into parts, in this example, into parts with equal probability as described above. With the domain divided into $2^b$ parts, for example, for b=3 there are 8 parts, the 7 boundaries between the parts are determined such that the $q^{th}$ boundary is at $-\bar{g}_{AX}^2 \ln(1-q/8)$, with quantization indices 0, . . . , 7 being associated with the parts. These values are maintained in the node's storage.

Between the times the node determines the distributions and the corresponding partitions, and transmits the distribution parameters to the other nodes, the node determines link state values based on transmissions it receives. It quantizes the link state value according to the corresponding partition it has stored to determine the link state quantization index. The node includes the current link state quantization indices in transmissions to its neighboring nodes, for example, in the acknowledgments of the transmissions it has received.

Considering a node that has received one of the repeated transmissions of the link state distribution parameter for a link, when it receives a quantization index for the link state of that link, it reconstructs a value of the link state according to the parameter value. For example, if a node X has received $\bar{g}_{AX}^2$ for the link state of the X→A link, and now receives a quantized index q for that link, it reconstructs an link state values using equation 8 above.

The nodes then use the reconstructed link state values in determining the regimes according to which they make relayed transmissions as described above.

4 Implementations and Alternatives

The approach to quantization and communication of the link state information may be implemented in software, in hardware, or in a combination of software and hardware. The software may include instructions (which may be resident in machine-readable non-transitory storage at each node) for causing a processor at each node to perform the quantization and reconstruction procedures described above. These functions may be implemented in or assisted by hardware (e.g., logic gate circuitry) at the nodes.

It should be understood that the entropy based approach in which each quantized value has equal probability is only one example in which quantization is based on the distribution of the variable being quantized. In other examples, the underlying probability distribution is used, but the quantile points may not be uniformly space (e.g., the quantized values are not necessarily uniform, even if their relative probabilities are fixed). In other examples, the quantization regions are determined based on multiple mean values, for example, selected in such a way that the probability of choosing the correct regime at a node is maximized.

What is claimed is:

1. A method for communicating quantized values comprising,
at a communication source:
  collecting a set of values from a domain of possible values;
  repeatedly determining values of one or more parameters characterizing a distribution of the collected set of values, transmitting the values of the one or more parameters to a communication destination, and determining a partition of the domain of possible values including a plurality of parts of the domain, each part being associated with a different quantization index, and storing the partition in a memory;
  between transmissions of the values of the one or more parameters, repeating
    quantizing a value according to the stored partition to determine a quantization index for the value, and
    transmitting the quantization index to the communication destination; and
at the communication destination:
  repeatedly receiving from the communication source values of the one or more parameters characterizing a distribution;
  between receptions of the values of the one or more parameters, repeating receiving a quantization index from the communication source, and reconstructing a value according to the received quantization index and received one or more parameters characterizing a distribution;

wherein the communication source and the communication destination are nodes in a wireless communication network, and the values represent link state information on a link between nodes of the network.

2. The method of claim 1 wherein determining the partition of the domain of possible values includes determining the parts of the domain to have equal probability of occurrence according to the characterized distribution of the set values.

3. The method of claim 1 wherein reconstructing a value according to the received quantization index includes determining the reconstructed value to be a value in the part of the domain associated with the quantization index.

4. The method of claim 3 wherein the reconstructed value is an expect value in the part of the domain associated with the quantization index determined according to the characterized distribution of values.

5. The method of claim 1 wherein the link state information presents state information for a link from the communication destination to the communication source.

6. The method of claim 1 wherein the link state information presents state information for a link from a node of the network other than the communication destination to the communication source.

7. The method of claim 1 wherein transmitting the values of the parameters and transmitting the quantized indices to the communication destination include transmitting via another node of the wireless network.

8. The method of claim 1 further comprising, at the communication destination, using the reconstructed value to determine a method of communicating information to the communication source over the network.

9. The method of claim 8 wherein determining the method of communicating information includes allocating a communication resource between a direct link and a relayed path over the network.

10. Software stored on a non-transitory machine-readable media comprising instructions stored thereupon for causing a processor at a communication source to perform a procedure including:

collecting a set of values from a domain of possible values;

repeatedly determining values of one or more parameters characterizing a distribution of the collected set of values, transmitting the values of the one or more parameters to a communication destination, determining a partition of the domain of possible values including a plurality of parts of the domain, each part being associated with a different quantization index, and storing the partition in a memory;

between transmissions of the values of the one or more parameters, repeating
quantizing a value according to the stored partition to determine a quantization index for the value, and
causing transmission of the quantization index to the communication destination;

and for causing a processor at the communication destination to perform a procedure including:
repeatedly receiving from the communication source values of the one or more parameters characterizing a distribution;
between receptions of the values of the one or more parameters, repeating
receiving a quantization index from the communication source, and
reconstructing a value according to the received quantization index and received one or more parameters characterizing a distribution;

wherein the communication source and the communication destination are nodes in a wireless communication network, and the values represent link state information on a link between nodes of the network.

11. A wireless network comprising a first communication node configured to communicate in the wireless communication network comprising a plurality of communication nodes including said first communication node, the wireless communication network configured to provide relayed communication between the communication nodes, wherein the first communication node comprises:

a transceiver configured for wireless communication over links with other of the communication nodes;

a data storage; and a processor configured to
collect a set of values from a domain of possible values associated with characteristics of communication links from one or more other nodes of the communication nodes to the first node;
repeatedly determine values of one or more parameters characterizing a distribution of the collected set of values for each of the communication links, transmitting the values of the one or more parameters to at least one other node of the communication nodes, and for each of the distributions determine a partition of the domain of possible values including a plurality of parts of the domain, each part being associated with a different quantization index, and storing the partition in the data storage;

between transmissions of the values of the one or more parameters,
quantize a value according to the stored partition for a distribution to determine a quantization index for the value, and
cause transmission of the quantization index to the at least one other node;

wherein the wireless network further comprises a second node and wherein a processor of the second node is configured to:
receive values of the one or more parameters characterizing distributions of values associated with communication characteristics of communication links between at least some nodes of the communication nodes;
receiving quantized values representing characteristics of the communication links, the communication links;
determining estimates of the characteristics of the communication links based on the received quantized values and the received values of the one or more parameters; and
selecting, according to the determined estimates, a communication approach for communication from the communication node to the second node.

12. The wireless network of claim 11, further comprising a third node, and wherein the communication links include at least (a) a link from the communication node to the second node, (b) a link from the communication node to the third node, and (c) a link from the third node to the second node.

13. The communication node of claim 12, wherein selecting the communication approach includes selecting from a plurality of approaches including a relayed approach making used of the third node to relay communication from the first node to the second node.

* * * * *